(12) United States Patent
Lee et al.

(10) Patent No.: US 10,878,532 B2
(45) Date of Patent: *Dec. 29, 2020

(54) DISPLAY DEVICE, SYSTEM AND CONTROLLING METHOD THEREFOR

(71) Applicant: SAMSUNG ELECTRONICS CO., LTD., Suwon-si (KR)

(72) Inventors: Min-woo Lee, Hwaseong-si (KR); Jong-ho Kim, Seongnam-si (KR); Hyun-Hee Park, Seoul (KR); Jae-hun Cho, Suwon-si (KR); Ho-jin Kim, Suwon-si (KR); Yong-man Lee, Suwon-si (KR); Won-hee Choe, Seoul (KR); Dong-kyoon Han, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/181,506

(22) Filed: Nov. 6, 2018

(65) Prior Publication Data

US 2019/0087933 A1 Mar. 21, 2019

Related U.S. Application Data

(63) Continuation of application No. 15/508,173, filed as application No. PCT/KR2015/009090 on Aug. 28, 2015, now Pat. No. 10,140,685.

(30) Foreign Application Priority Data

Sep. 2, 2014 (KR) ........................ 10-2014-0116289

(51) Int. Cl.
*G06T 3/40* (2006.01)
*H04N 21/462* (2011.01)
*G09G 3/20* (2006.01)

(52) U.S. Cl.
CPC .............. *G06T 3/40* (2013.01); *G09G 3/2096* (2013.01); *H04N 21/462* (2013.01); *G09G 2320/0613* (2013.01); *G09G 2330/021* (2013.01)

(58) Field of Classification Search
CPC .............. G06T 3/40; H04N 21/234363; H04N 21/234372; G09G 2320/0613;
(Continued)

(56) References Cited

U.S. PATENT DOCUMENTS 5,280,546 A    1/1994  Machida et al.
5,394,166 A *  2/1995  Shimada ............... G06F 1/3265
                                                      345/98
(Continued)

FOREIGN PATENT DOCUMENTS

CN    1388514 A    1/2003
CN    1977525 A    6/2007
(Continued)

OTHER PUBLICATIONS

Communication dated May 7, 2019 issued by the State Intellectual Property Office of P.R. China in counterpart Chinese Application No. 201580059574.9.
(Continued)

*Primary Examiner* — Jeffery A Brier
(74) *Attorney, Agent, or Firm* — Sughrue Mion, PLLC

(57) ABSTRACT

A display device is provided. The display device includes: an image processor image-processing contents and scaling the contents at a first scaling magnification; a controller determining a second scaling magnification on the basis of a resolution of the contents scaled at the first scaling magnification and an output resolution of the display device; and a display scaling the contents scaled at the first scaling magnification depending on the second scaling magnifica-
(Continued)

tion and displaying the contents scaled depending on the second scaling magnification.

13 Claims, 18 Drawing Sheets

(58) Field of Classification Search
CPC ... G09G 2340/0407; G09G 2340/0414; G09G 2340/0421; G09G 2340/0428; G09G 2340/0435; G06F 1/3265
See application file for complete search history.

(56) References Cited

U.S. PATENT DOCUMENTS

| | | | |
|---|---|---|---|
| 5,422,827 A | 6/1995 | Niehaus | |
| 5,812,144 A | 9/1998 | Potu et al. | |
| 7,088,392 B2 | 8/2006 | Kakarala et al. | |
| 7,589,748 B2 | 9/2009 | Ahn | |
| 7,724,271 B2 | 5/2010 | Ha et al. | |
| 7,903,126 B2 | 3/2011 | Yamada | |
| 8,711,180 B2 | 4/2014 | Kim | |
| 8,738,826 B2 | 5/2014 | Stahl et al. | |
| 8,878,878 B2 | 11/2014 | Yun | |
| 9,131,098 B2 | 9/2015 | Jang et al. | |
| 2005/0212784 A1* | 9/2005 | Wang | G09G 3/2096 345/204 |
| 2005/0248596 A1* | 11/2005 | Smith | G09G 5/005 345/698 |
| 2006/0146075 A1 | 7/2006 | Weiss et al. | |
| 2007/0040838 A1 | 2/2007 | Jeffrey et al. | |
| 2008/0002052 A1 | 1/2008 | Yamauchi | |
| 2008/0278768 A1 | 11/2008 | Peusens | |
| 2010/0034475 A1 | 2/2010 | Chiu et al. | |
| 2010/0231611 A1 | 9/2010 | Yamada | |
| 2011/0134999 A1 | 6/2011 | Han et al. | |
| 2011/0170801 A1* | 7/2011 | Lu | G06T 3/4007 382/298 |
| 2011/0285764 A1 | 11/2011 | Kimura et al. | |
| 2012/0236183 A1 | 9/2012 | Hiramatsu et al. | |
| 2013/0169755 A1 | 7/2013 | Choo et al. | |
| 2013/0315499 A1* | 11/2013 | Ju | H04N 5/23222 382/255 |
| 2014/0072029 A1 | 3/2014 | Zhai et al. | |
| 2014/0098182 A1 | 4/2014 | Kramarenko et al. | |
| 2014/0211861 A1 | 7/2014 | Lee et al. | |
| 2014/0226710 A1 | 8/2014 | Park et al. | |
| 2014/0289787 A1* | 9/2014 | Minemura | H04N 21/4126 725/116 |
| 2014/0328546 A1 | 11/2014 | Kourousias et al. | |
| 2015/0181117 A1* | 6/2015 | Park | H04N 5/23216 348/372 |
| 2016/0335986 A1 | 11/2016 | Bae et al. | |

FOREIGN PATENT DOCUMENTS

| | | |
|---|---|---|
| CN | 102256072 A | 11/2011 |
| CN | 102428492 A | 4/2012 |
| EP | 1289310 B1 | 7/2011 |
| JP | 4-199477 A | 7/1992 |
| JP | 7-184043 A | 7/1995 |
| JP | 2003-309783 A | 10/2003 |
| JP | 2008-96806 A | 4/2008 |
| JP | 2008-116812 A | 5/2008 |
| JP | 2010-212991 A | 9/2010 |
| KR | 100472470 B1 | 3/2005 |
| KR | 100657145 B1 | 12/2006 |
| KR | 100716982 B1 | 5/2007 |
| KR | 1020090054836 A | 6/2009 |
| KR | 101260316 B1 | 5/2013 |
| KR | 1020130076674 A | 7/2013 |
| KR | 1020130138143 A | 12/2013 |
| KR | 1020140044235 A | 4/2014 |
| KR | 101416272 B1 | 7/2014 |
| WO | 2005/116922 A1 | 12/2005 |
| WO | 2010/131167 A1 | 11/2010 |
| WO | 201 51 031 40 A1 | 7/2015 |

OTHER PUBLICATIONS

Communication dated Jun. 11, 2019, issued by the Japanese Patent Office in counterpart Japanese Application No. 2017-511900.
International Search Report dated Dec. 16, 2015, issued by the International Searching Authority in counterpart International Application No. PCT/KR2015/009090 (PCT/ISA/210).
Written Opinion dated Dec. 16, 2015, issued by the International Searching Authority in counterpart International Application No. PCT/KR2015/009090 (PCT/ISA/237).
Communication dated Mar. 13, 2018 issued by the European Patent Office in counterpart European Patent Application No. 15837645.9.
Communication dated Oct. 8, 2019, issued by the Japanese Patent Office in counterpart Japanese Application No. 2017-511900.
Communication dated Nov. 22, 2019, issued by the European Patent Office in counterpart European Application No. 15 837 645.9.
Communication dated Feb. 13, 2020, issued by the Korean Intellectual Property Office in counterpart Korean Application No. 10-2014-0116289.
Communication dated Mar. 2, 2020, issued by the State Intellectual Property Office of P.R. China in counterpart Chinese Application No. 201580059574.9.
Communication dated Aug. 21, 2020 from the State Intellectual Property Office of the P.R.China in Chinese application No. 201580059574.9.
Communication dated Aug. 20, 2020 from the European Patent Office in application No. 15837645.9.

* cited by examiner

FIG. 7

| | CONTENTS | FIRST SCALER | FRAME BUFFER | INTERFACE | DISPLAY |
|---|---|---|---|---|---|
| RELATED ART | 2560x1440 | 2560x1440 | 2560x1440 | 2560x1440 | 2560x1440 |
| SUGGESTION | 2560x1440 | 1920x1080 | 1920x1080 | 1920x1080 | 2560x1440 |

DATA RATE : DECREASE BY 44%

FIG. 8

|  | CONTENTS | FIRST SCALER | FRAME BUFFER | INTERFACE | DISPLAY |
|---|---|---|---|---|---|
| RELATED ART | 1280x720 | 2560x1440 | 2560x1440 | 2560x1440 | 2560x1440 |
| SUGGESTION | 1280x720 | 1280x720 | 1280x720 | 1280x720 | 2560x1440 |

DATA RATE : DECREASE BY 75%

DISPLAY DEVICE, SYSTEM AND CONTROLLING METHOD THEREFOR

CROSS-REFERENCE TO RELATED APPLICATIONS

This Application is a Continuation Application of U.S. patent application Ser. No. 15/508,173, filed on Mar. 2, 2017, which is a 371 of International Application No. PCT/KR2015/009090, filed on Aug. 28, 2015, which claims priority to Korean Application No. 10-2014-0116289, filed on Sep. 2, 2014, the entire contents of which are herein incorporated by reference.

TECHNICAL FIELD

Apparatuses and methods consistent with the present disclosure relate to a display device, a system, and a controlling method therefor, and more particularly, to a display device, a system and a controlling method therefor capable of scaling and displaying contents.

BACKGROUND ART

In accordance with the development of electronic technology, various types of electronic products have been developed and spread. Particularly, various display devices such as a television (TV), a mobile phone, a personal computer (PC), a laptop computer, a personal digital assistants (PDA), and the like, have been used in most of the households.

In accordance with an increase in the use of the display devices, user's needs for various functions have increased. Therefore, a lot of efforts of manufacturers to satisfy the user's needs have been made, such that products having a new function that is not present in the related art have been successively launched.

Therefore, functions performed in the display devices have become various. Particularly, as resolutions supported by the display devices have become various, a function of performing image-processing and scaling to be matched to various resolutions and displaying the processed and scaled image has become important.

The scaling processing technology according to the related art is to perform a process of analyzing edge information of an input image using various resources and regenerating or interpolating the input image at an output resolution of the display device. An example of a typical method includes a Bi-Linear Scaler, a Bi-Cubic Scaler, and the like.

In addition, the scaling processing technology according to the related art is mainly to detect the edge information using a mask window of 3×3 or more and apply a sharpness improving algorithm in a post-processing form after scaling according to a corresponding edge direction, and it is general to scale a resolution of an input image to be matched to an output resolution of the display device.

In addition, contents scaled to be matched to the output resolution of the display device are transferred to a display through an interface having a data rate matched to the output resolution of the display device.

Therefore, it is disadvantageous in terms of power efficiency and the use of resources to scale the contents to be matched to the output resolution of the display device from the beginning and transmit the scaled contents to the display.

DISCLOSURE

Technical Problem

The present disclosure provides a display device, a system and a controlling method therefor capable of scaling contents using a plurality of scalers.

Technical Solution

According to an aspect of the present disclosure, a display device includes: an image processor image-processing contents and scaling the contents at a first scaling magnification; a controller determining a second scaling magnification on the basis of a resolution of the contents scaled at the first scaling magnification and an output resolution of the display device; and a display scaling the contents scaled at the first scaling magnification depending on the second scaling magnification and displaying the contents scaled depending on the second scaling magnification.

The image processor may include a first scaler scaling the contents at the first scaling magnification, and the display may include a second scaler scaling the contents scaled at the first scaling magnification depending on the determined second scaling magnification.

The first scaler may determine the first scaling magnification and a scaling scheme of the first scaler on the basis of at least one of characteristic information of the contents and a power state of the display device.

The first scaler may transmit at least one of characteristic information of the contents and information on a scaling scheme of the first scaler to the second scaler, and the second scaler may determine a scaling scheme of the second scaler on the basis of at least one of the characteristic information of the contents and the information on the scaling scheme of the first scaler.

The second scaler may decide a layout structure of pixels on the basis of the characteristic information of the contents, determine a scaling weight of the pixels on the basis of the decided layout structure of the pixels, and determine the scaling scheme of the second scaler on the basis of at least one of the determined scaling weights of the pixels and the information on the scaling scheme of the first scaler.

The first scaler may differently apply the first scaling magnification and the scaling scheme of the first scaler to each of frames of the contents to perform scaling, the controller may determine the second scaling magnification for each of the frames of the contents, and the second scaler may determine the scaling scheme of the second scaler for each of the frames of the contents and perform scaling on the basis of the scaling scheme of the second scaler determined for each of the frames of the contents and the second scaling magnification.

The first scaling magnification may exceed 0 and be less than 1 and the second scaling magnification may exceed 1, the first scaler may down-scale the contents, and the second scaler may up-scale the down-scaled contents.

The characteristic information of the contents may include at least one of a kind of contents, a size and a distribution of boundary lines of objects included in the contents, a kind and a distribution of characters included in the contents, and a resolution.

The display device may further include an interface connecting the image processor and the display to each other, wherein the contents scaled at the first scaling magnification, the characteristic information of the contents, and the information on the scaling scheme of the first scaler are transmitted through the interface.

According to another aspect of the present disclosure, a system includes: a display device; and a contents providing device providing contents to the display device, wherein the contents providing device image-processes the contents, scales the contents at a first scaling magnification, and transmits the contents scaled at the first scaling magnification to the display device, and the display device determines a second scaling magnification on the basis of a resolution of the contents scaled at the first scaling magnification and an output resolution of the display device, scales the contents scaled at the first scaling magnification depending on the second scaling magnification, and displays the contents scaled depending on the second scaling magnification.

The contents providing device may determine the first scaling magnification and a scaling scheme of the contents providing device on the basis of at least one of characteristic information of the contents, a power state of the contents providing device, and a connection state between the contents providing device and the display device.

The contents providing device may transmit at least one of the characteristic information of the contents and information on the scaling scheme of the contents providing device to the display device, and the display device may determine a scaling scheme of the display device on the basis of at least one of the characteristic information of the contents and the information on the scaling scheme of the contents providing device.

The display device may include: a plurality of scalers; and a controller controlling some of the plurality of scalers to be turned off and controlling the others of the plurality of scalers to scale the contents scaled at the first scaling magnification depending on the second scaling magnification.

According to still another aspect of the present disclosure, a controlling method for a display device including a first scaler and a second scaler includes: image-processing contents and scaling the contents at a first scaling magnification; determining a second scaling magnification on the basis of a resolution of the contents scaled at the first scaling magnification and an output resolution of the display device; and scaling the contents scaled at the first scaling magnification depending on the second scaling magnification and displaying the contents scaled depending on the second scaling magnification.

In the scaling of the contents at the first scaling magnification, the first scaling magnification and a scaling scheme of the first scaler may be determined on the basis of at least one of characteristic information of the contents and a power state of the display device.

The controlling method for a display device may further include transmitting at least one of characteristic information of the contents and information on a scaling scheme of the first scaler to the second scaler, wherein in the displaying of the contents scaled depending on the second scaling magnification, a scaling scheme of the second scaler is determined on the basis of at least one of the characteristic information of the contents and the information on the scaling scheme of the first scaler.

In the displaying of the contents scaled depending on the second scaling magnification, a layout structure of pixels may be decided on the basis of the characteristic information of the contents, a scaling weight of the pixels may be determined on the basis of the decided layout structure of the pixels, and the scaling scheme of the second scaler may be determined on the basis of at least one of the determined scaling weights of the pixels and the information on the scaling scheme of the first scaler.

In the scaling of the contents at the first scaling magnification, the first scaling magnification and the scaling scheme of the first scaler may be differently applied to each of frames of the contents to perform scaling, in the determining of the second scaling magnification, the second scaling magnification may be determined for each of the frames of the contents, and in the displaying of the contents scaled depending on the second scaling magnification, the scaling scheme of the second scaler may be determined for each of the frames of the contents and scaling may be performed on the basis of the scaling scheme of the second scaler determined for each of the frames of the contents and the second scaling magnification.

The first scaling magnification may be 0 or more and be less than 1 and the second scaling magnification may exceed 1, in the scaling of the contents at the first scaling magnification, the contents may be down-scaled, and in the displaying of the contents scaled depending on the second scaling magnification, the down-scaled contents may be up-scaled.

The characteristic information of the contents may include at least one of a kind of contents, a size and a distribution of boundary lines of objects included in the contents, a kind and a distribution of characters included in the contents, and a resolution.

Advantageous Effects

As described above, according to the diverse exemplary embodiments of the present disclosure, the contents are scaled using the plurality of scalers, thereby making it possible to reduce power consumption and used resources.

DESCRIPTION OF DRAWINGS

FIGS. 7 and 8 are tables for describing a decrease effect of a data rate according to an exemplary embodiment of the present disclosure;

BEST MODE

Hereinafter, exemplary embodiments of the present disclosure will be described in more detail with reference to the accompanying drawings. In addition, when it is decided that a detailed description for the known functions or configurations related to the present disclosure may obscure the gist of the present disclosure, the detailed description therefor will be omitted. Further, the following terminologies are defined in consideration of the functions in the present disclosure and may be construed in different ways by the intention of users and operators. Therefore, the definitions thereof should be construed based on the contents throughout the present specification.

Figure 1:
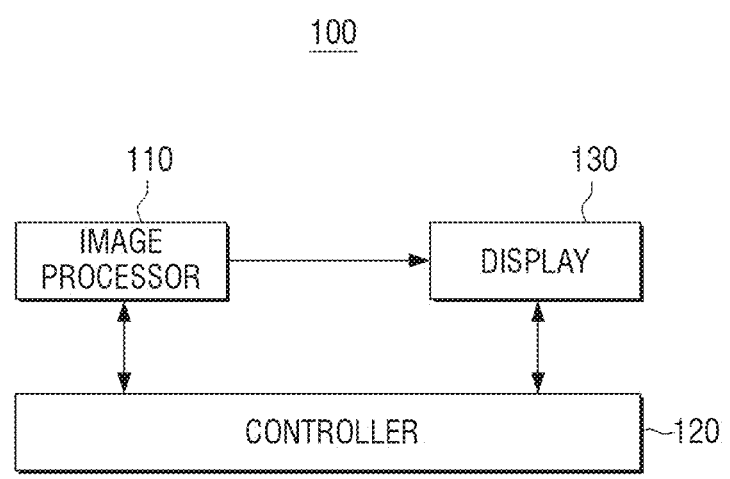
FIG. 1 is a block diagram illustrating components of a display device according to an exemplary embodiment of the present disclosure.

FIG. 1 is a block diagram illustrating components of a display device according to an exemplary embodiment of the present disclosure.

As illustrated in FIG. 1, a display device 100 includes an image processor 110, a controller 120, and a display 130. Here, the display device 100 may be implemented by various types of electronic device such as a television (TV), an electronic board, an electronic table, a large format display (LFD), a smart phone, a tablet personal computer (PC), a desktop PC, a laptop computer, and the like.

The image processor 110 image-processes contents, and scales the contents at a first scaling magnification. For example, the image processor 110 may perform operations such as decoding, scaling, frame rate conversion, and the like, on contents input from a contents source to perform image-processing in a form that may be output on the display 130. Here, the image processor 110 may scale the contents at a first scaling magnification at the time of scaling the contents. A method for determining the first scaling magnification will be described below.

The controller 120 determines a second scaling magnification on the basis of a resolution of the contents scaled at the first scaling magnification in the image processor 110 and an output resolution of the display device 100. For example, in the case in which the contents are scaled at a scaling magnification of 1920×1080 in the image processor 110, a resolution of the contents scaled in the image processor 110 is 1920×1080, and in the case in which it is assumed that the output resolution of the display device 100 is 2560×1440, the controller 120 may compare 1920×1080, which is the resolution of the contents scaled in the image processor 110, and 2560×1440, which is the output resolution of the display device 100, with each other to determine the second scaling magnification.

The display 130 may scale the contents scaled at the first scaling magnification in the image processor 110 depending on the second scaling magnification determined in the controller 120, and display the contents scaled depending on the second scaling magnification.

Meanwhile, the display 130 may be implemented by a liquid crystal display (LCD), an organic light emitting display (OLED), a plasma display panel (PDP), or the like, to display the contents.

Figure 2:
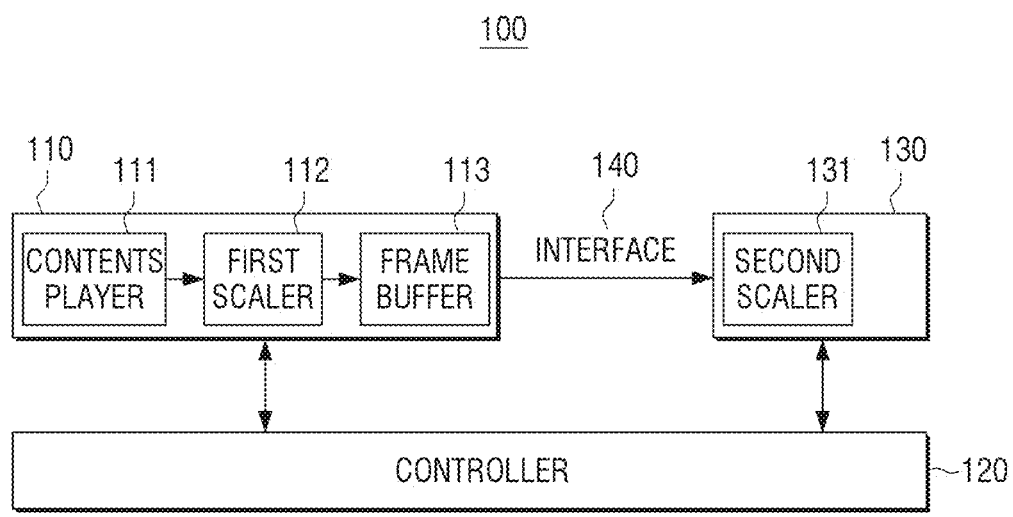
FIG. 2 is a block diagram illustrating detailed components of the display device according to an exemplary embodiment of the present disclosure.

Meanwhile, FIG. 2 is a block diagram illustrating detailed components of the display device according to an exemplary embodiment of the present disclosure.

Referring to FIG. 2, the image processor 110 may include a contents player 111, a first scaler 112, and a frame buffer 113. In addition, although not illustrated, the image processor 100 may further include a contents source providing the contents. The contents source may also be present outside the image processor 110.

The contents player 111 may perform an operation of decoding the contents input from the contents source (not illustrated) and image-processing and reproducing the contents.

In addition, the first scaler 112 may primarily scale the contents depending on the first scaling magnification. In detail, the first scaler may scale the contents image-processed in the contents player 111 depending on the first scaling magnification. Here, the first scaling magnification may have a value exceeding 0. In addition, since a value of the first scaling magnification is not limited to a specific value or less, the first scaling magnification may also have an infinite value.

For example, in the case in which the first scaling magnification has a value between 0 and 1, the first scaler 112 down-scales the image-processed contents, in the case in which the first scaling magnification has a value of 1, the first scaler 112 maintains an original resolution of the image-processed contents, and in the case in which the first scaling magnification has a value exceeding 1, the first scaler 112 up-scales the image-processed contents.

That is, when it is assumed that a resolution of the image-processed contents is 1920×1080, in the case in which the first scaling magnification is set to the value between 0 and 1, the first scaler 112 down-scales the resolution of the image-processed contents to 1280×720, and in the case in which the first scaling magnification is set to the value exceeding 1, the first scaler 112 up-scales the image-processed contents to 2560×1440.

In addition, the frame buffer 113 may output the contents scaled depending on the first scaling magnification in the first scaler 112 to the display 130 in a frame unit.

Meanwhile, referring to FIG. 2, the display 130 may include a second scaler 131.

The second scaler 131 may scale the contents scaled depending on the first scaling magnification in the first scaler 112 depending on the second scaling magnification. Here, the second scaling magnification may be determined by the controller 120, and the controller 120 may determine the second scaling magnification on the basis of the resolution of the contents scaled at the first scaling magnification and the output resolution of the display device 100.

For example, when a scaling factor corresponding to the resolution of the contents scaled at the first scaling magnification is scaleM and a scaling factor corresponding to the output resolution of the display device 100 is scaleN, the controller 120 may determine the second scaling magnification through the following Equation.

$$\text{Second Scaling Magnification} = \text{scale}M/\text{scale}N \quad \text{[Equation 1]}$$

In addition, the second scaler 131 may scale the contents scaled depending on the first scaling magnification depending on the second scaling magnification determined by the controller 120 as described above.

Likewise, the second scaling magnification may have a value exceeding 0. In addition, since a value of the second scaling magnification is not limited to a specific value or less, the second scaling magnification may also have an infinite value, and in the case in which the second scaling magnification has a value between 0 and 1, the second scaler 131 down-scales the contents scaled depending on the first scaling magnification, in the case in which the second scaling magnification has a value of 1, the second scaler 131 maintains a resolution of the contents scaled depending on the first scaling magnification, and in the case in which the second scaling magnification has a value exceeding 1, the second scaler 131 up-scales the contents scaled depending on the first scaling magnification.

Meanwhile, the first scaler 112 may determine the first scaling magnification and a scaling scheme of the first scaler 112 on the basis of at least one of characteristic information of the contents and a power state of the display device.

Here, the characteristic information of the contents may include at least one of a kind of contents, a size and a distribution of boundary lines of objects included in the contents, a kind and a distribution of characters included in the contents, and the resolution.

The characteristic information of the contents may be detected by the contents player 111 or the first scaler 112, and may be detected before the first scaler 112 scales the contents or during a period in which the first scaler 112 scales the contents.

For example, in the case in which a kind of contents is a text, the text has a feature that a boundary line is clear. Therefore, the first scaler 112 may determine the first scaling magnification and the scaling scheme of the first scaler 112 in consideration of such a feature of the text.

In addition, in the case in which a kind of contents is an image including natural scenery, the image has a feature that a boundary line between objects corresponding to the natural scenery is relatively unclear as compared with the text. Therefore, the first scaler 112 may determine the first scaling magnification and the scaling scheme of the first scaler 112 in consideration of such a feature of the image including the natural scenery to be different from those in the case in which the kind of contents is the text.

In addition, the first scaler 112 may determine the first scaling magnifications and the scaling schemes of the first scaler 112 to be different from each other depend on the size or a thickness and the distribution of the boundary lines of the objects included in the contents, the kind and the distribution of the characters included in the contents, and the resolution of the contents. A detailed description therefor will be provided below.

In addition, in the case in which the display device 100 needs to be operated at a low power due to an increase in an amount of consumed power of the display device 100, the first scaler 112 may determine that the first scaling magnification is a low value. That is, in the case in which a situation in which a low power operation is required occurs, the first scaler 112 may determine that the first scaling magnification is the value between 0 and 1, thereby down-scaling the contents.

Meanwhile, in the case in which a problem does not occurs even though the display device 100 is operated at a high power due to a low amount of consumed power of the display device 100 or in the case in which a high image-quality contents need to be scaled, the first scaler 112 may determine that the first scaling magnification is a high value. That is, in a situation in which the low power operation is not required, the first scaler 112 may determine that the first scaling magnification is the value exceeding 1, thereby up-scaling the contents.

Meanwhile, the second scaler 131 may interwork with the first scaler 112. In detail, the second scaler 131 may be operated in consideration of characteristics of the first scaler, and scaling characteristics of the second scaler may be changed depending on the characteristics of the first scaler 112.

Here, the characteristics of the first scaler 112 are related to the first scaling magnification and the scaling scheme of the first scaler.

In addition, the first scaler 112 may transmit at least one of characteristic information of the contents and information on the scaling scheme of the first scaler 112 to the second scaler. Therefore, the second scaler 131 may determine a scaling scheme of the second scaler 131 on the basis of at least one of the characteristic information of the contents and the information on the scaling scheme of the first scaler 112 received from the first scaler 112.

That is, the second scaler 131 may receive the information on the scaling scheme of the first scaler 112 to be operated in consideration of characteristics of the first scaler 112, and since the scaling scheme of the first scaler 112 may be changed depending on characteristics of the contents, the second scaler 131 may also receive the characteristic information of the contents. This will be described in more detail with reference to FIG. 3.

Figure 3:
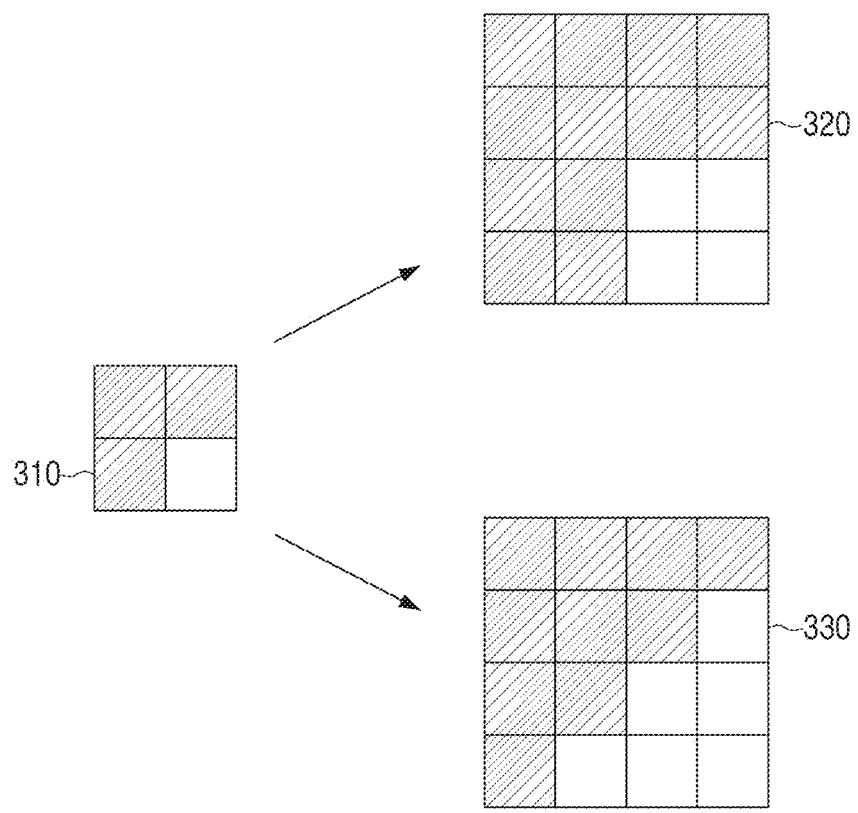
FIG. 3 is a view illustrating a scaling scheme of a second scaler depending on characteristics of contents according to an exemplary embodiment of the present disclosure.

FIG. 3 is a view illustrating a scaling scheme of a second scaler depending on characteristics of contents according to an exemplary embodiment of the present disclosure.

Referring to FIG. 3, it may be appreciated that pixels 310 of 2×2 of the contents scaled depending on the first scaling magnification may be scaled in two schemes 320 and 330 by the second scaler 131.

That is, in the case in which the kind of contents is a character such as the text, the text has a feature that the boundary line is clear. Therefore, the scaling scheme performed by the second scaler 131 also needs to be a scheme of making the boundary line clear, and it may be appreciated that the scaling scheme satisfying such a condition is a first scheme 320.

The number of rugged portions is less in the first scheme 320 than in a second scheme 330, such that the first scheme 320 is appropriate for making a boundary between objects clear.

In addition, in the case in which the kind of contents is the image including the natural scenery, the image has a feature that the boundary line between the objects corresponding to the natural scenery does not need to clear as compared with the text and needs to be naturally and smoothly viewed. Therefore, the scaling scheme performed by the second scaler 131 is not the scheme of making the boundary line clear, but needs to be a scheme of allowing the boundary line to be naturally and smoothly viewed, and it may be appreciated that the scaling scheme satisfying such a condition is the second scheme 330.

The number of rugged portions is more in the second scheme 330 than in the first scheme 320, such that the second scheme 330 is appropriate for making a boundary between the objects smooth and natural.

As described above with reference to FIG. 3, the scaling schemes that may be selected by the second scaler 131 may be various, and the second scaler 131 may select one of the various scaling schemes on the basis of at least one of the characteristic information of the contents and the information on the scaling scheme of the first scaler 112 to scale the contents.

Meanwhile, again referring to FIG. 2, the display device 100 according to an exemplary embodiment of the present disclosure may further include an interface 140 connecting the image processor 110 and the display 130 to each other.

In addition, the image processor 110 or the first scaler 112 included in the image processor 110 may transmit the contents scaled at the first scaling magnification, the characteristic information of the contents, and the information on the scaling scheme of the first scaler 112 to the display 130 or the second scaler 131 through the interface 140.

Here, the interface 140 may have a series form, a parallel form, or a combination of series and parallel forms, and may have a wireless form, a wired form, or a combination of wired and wireless forms. In addition, the interface 140 may be implemented by a chip-to-chip form, various kinds of printed circuit boards (PCBs), dedicated or common buses in a semiconductor chip, wired and wireless networks formed of a master and a slave, wired and wireless networks of peer-to-peer, or the like.

Meanwhile, the second scaler 131 may decide a layout structure of pixels on the basis of the characteristic information of the contents, determine a scaling weight of the pixels on the basis of the decided layout structure of the pixels, and determine the scaling scheme of the second scaler 131 on the basis of at least one of the determined scaling weight of the pixels and the information on the scaling scheme of the first scaler 112.

That is, as illustrated above with reference to FIG. 3, the second scaler 131 may select one of the various scaling schemes on the basis of at least one of the characteristic information of the contents and the information on the scaling scheme of the first scaler 112 to scale the contents, and a detailed process of determining the scaling scheme of the second scaler 131 on the basis of the characteristic information of the contents by the second scaler 131 will be described with reference to FIGS. 4 to 6.

Figure 4:
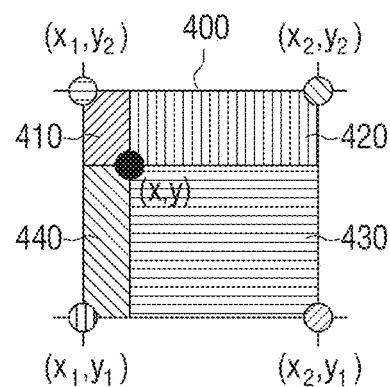
FIGS. 4 to 6 are views for describing a process of determining a scaling scheme of the second scaler according to an exemplary embodiment of the present disclosure.
Figure 4:
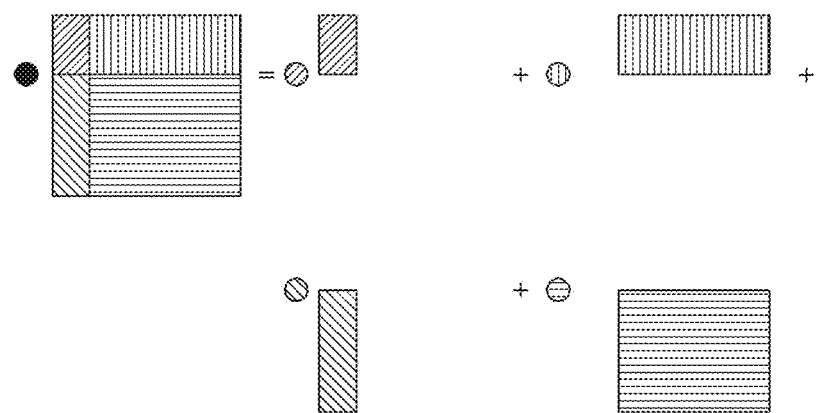
Figure 5:
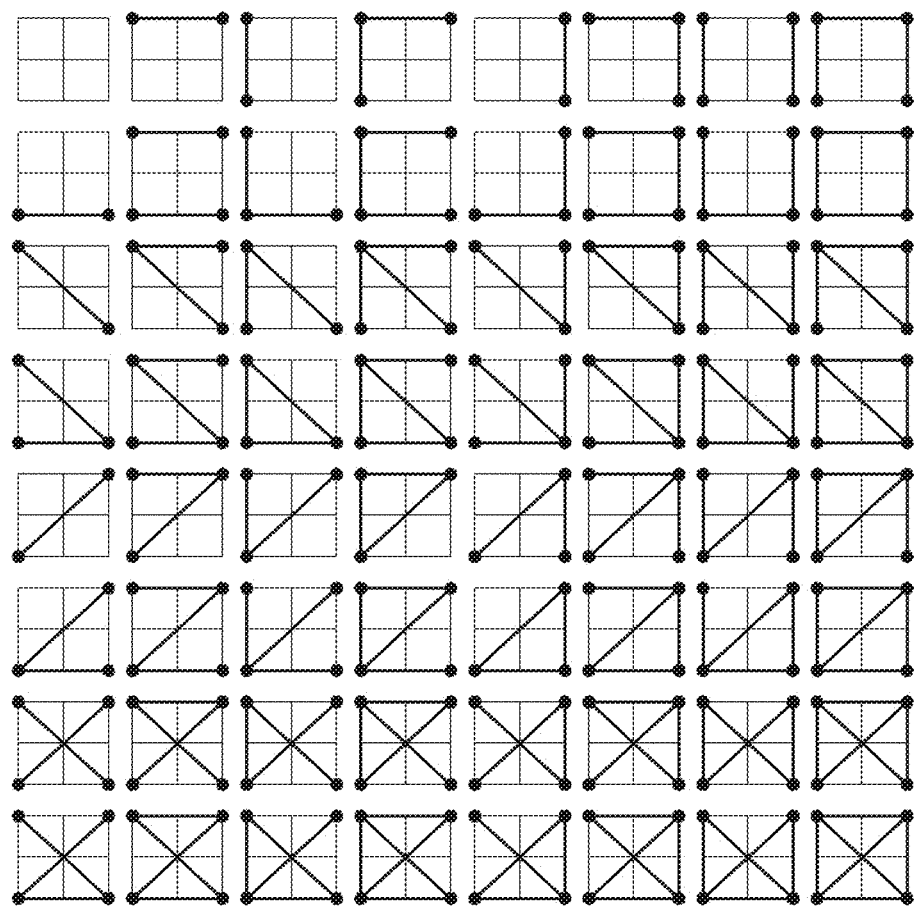
Figure 6:
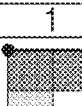

FIGS. 4 to 6 are views for describing a process of determining a scaling scheme of the second scaler according to an exemplary embodiment of the present disclosure.

In FIG. 4, which relates to a scaling scheme of a bi-linear among generally used scaling schemes, at the time of scaling a pixel corresponding to a point (X, Y) present in a region 400 consisting of a point $(X_1, Y_1)$ a point, $(X_1, Y_2)$, a point $(X_2, Y_1)$, and a point $(X_2, Y_2)$, the second scaler 131 may add up values calculated on the basis of R, G, and B values of a pixel corresponding to the point $(X_1, Y_1)$ and a region 420 including the point (X, Y) and the point $(X_2, Y_2)$, values calculated on the basis of R, G, and B values of a pixel corresponding to the point $(X_1, Y_2)$ and a region 430 including the point (X, Y) and the point $(X_2, Y_1)$, values calculated on the basis of R, G, and B values of a pixel corresponding to the point $(X_2, Y_2)$ and a region 440 including the point (X, Y) and the point $(X_1, Y_1)$, and values calculated on the basis of R, G, and B values of a pixel corresponding to the point $(X_2, Y_1)$ and a region 410 including the point (X, Y) and the point $(X_1, Y_2)$ to calculate R, G, and B values of the pixel corresponding to the point (X, Y).

In addition, for example, in the case in which the second scaler 131 refers to original pixels of 2×2, information on the pixels may be divided into sixty four cases as illustrated in FIG. 5. Here, when the second scaler 131 analyzes a layout structure of the pixels in consideration of the scaling scheme of the first scaler 112, an actually utilized layout structure of the pixels may be compressed to twenty two cases as illustrated in FIG. 6.

In addition, the second scaler 131 may again divide the actually utilized layout structure of the pixels of the twenty two cases of FIG. 6 into ten classes to determine the scaling weight of the pixels.

In addition, the second scaler 131 may determine the scaling scheme of the second scaler 131 on the basis of at least one of the determined scaling weight of the pixels and the information on the scaling scheme of the first scaler 112, and may interwork with the first scaler 112 through the scaling scheme determined as described above to control a sharpness an a jagging element of the scaled image, thereby generating optimal image quality.

As described above, the scaling schemes 320 and 330 of the second scaler 131 may be differently determined depending on the kind of contents as illustrated in FIG. 3 on the basis of at least one of the scaling weight of the pixels and the information on the scaling scheme of the first scaler 112.

For example, in the case in which the second scaler 131 receives information on textures of the objects included in the contents from the first scaler 112, the second scaler 131 may decide the layout structure of the pixels and determine the scaling weight of the pixels, on the basis of the received information on the textures of the objects. In addition, the second scaler 131 may determine the scaling scheme of the second scaler 131 on the basis of at least one of the scaling weight of the pixels determined on the basis of the information on the textures of the objects and the information on the scaling scheme of the first scaler 112. The contents scaled by the scaling scheme of the second scaler 131 determined as described above may sufficiently reflect the textures of the objects.

FIGS. 7 and 8 are tables for describing a decrease effect of a data rate according to an exemplary embodiment of the present disclosure.

Referring to FIG. 7, in the related art, in the case in which a resolution of original contents is 2560×1440 and an output resolution of the display device 100 is 2560×1440, the first scaler 112 scales the resolution of the contents to be the same as the output resolution of the display device 100, such that the resolution of the original contents is maintained as 2560×1440. Therefore, all of the frame buffer 113, the interface 140, and the display 130 can not but process the contents having the resolution of 2560×1440.

On the other hand, the first scaler 112 according to an exemplary embodiment of the present disclosure downscales the resolution of the original contents from 2560×1440 to 1920×1080. Therefore, the resolution of the contents may be processed as 1920×1080 in both of the frame buffer 113 and the interface 140 and be then again up-scaled to 2560×1440 in the display 130.

Therefore, as compared with the related art, the resolution of the contents processed in the frame buffer 113 and the interface 140 is decreased, such that a data rate may also be decreased (by 44%). As a result, an amount of consumed power or resources is also decreased.

Referring to FIG. 8, in the related art, in the case in which a resolution of original contents is 1280×720 and an output resolution of the display device 100 is 2560×1440, the first scaler 112 up-scales the resolution of the original contents from 1280×720 to 2560×1440, which is the output resolution of the display device 100, from the beginning and the contents of which the resolution is up-scaled to 2560×1440 as described above are processed with the same resolution being maintained in the frame buffer 113, the interface 140, and the display 140.

On the other hand, the first scaler 112 according to an exemplary embodiment of the present disclosure does not up-scale the resolution of the original contents to the output resolution of the display device 100 from the beginning, but maintains the resolution of the original contents as 1280×720, and the contents of which the resolution is maintained as 1280×720 as described above are processed with the same resolution being maintained also in the frame buffer 113 and the interface 140. Then, the resolution of the contents is up-scaled to 2560×1440 in the display 130.

Therefore, as compared with the related art, the contents are processed at the resolution of the 1280×720 rather than 2560×1440 in the frame buffer 113 and the interface 140, such that a data rate may also be decreased (by 75%). As a result, an amount of consumed power or resources is also decreased.

Meanwhile, the first scaler 112 or the second scaler 131 may maintain a resolution of the input contents, which may be implemented by setting the first scaling magnification or the second scaling magnification to 1 or may be implemented by turning off the first scaler 112 or the second scaler 131.

FIGS. 9 to 14 are views for describing various operation modes according to an exemplary embodiment of the present disclosure.

Figure 9:
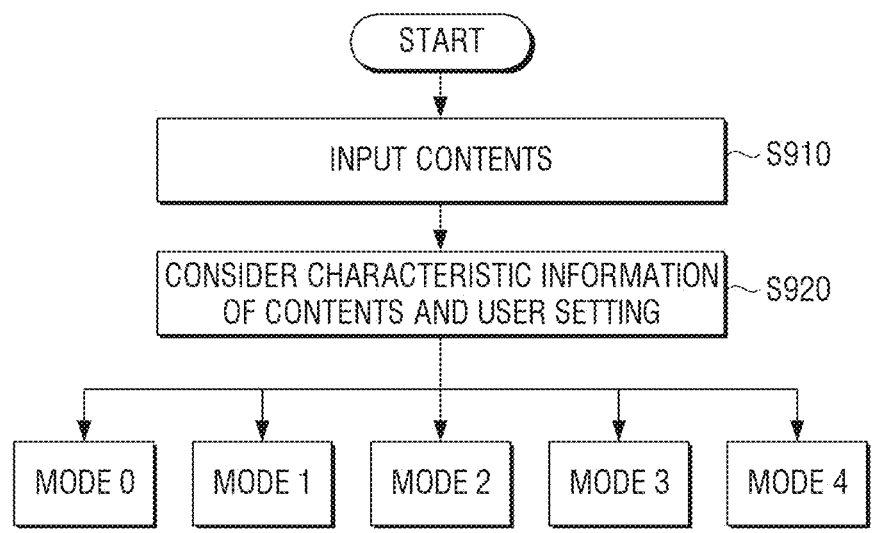
FIGS. 9 to 14 are views for describing various operation modes according to an exemplary embodiment of the present disclosure.

Referring to FIG. 9, when the contents are input to the image processor (S910), the contents are analyzed to detect the characteristic information of the contents. In addition, the display device 100 may further include an input (not illustrated) for receiving a user manipulation, and the controller 120 may control the first scaler 131 and the second scaler 131 by a user setting result depending on the user manipulation input through the input (not illustrated) to adjust the respective scaling magnifications and the scaling schemes.

The controller 120 may consider at least one of the characteristic information of the contents and the user setting result (S920) to determine one of five operation modes Mode 0, Mode 1, Mode 2, Mode 3, and Mode 4. Here, the number of operation modes is not limited to five, but may be greater than five depending on a power state of the display device 100, characteristics of the contents, a user setting, or the like.

The respective operation modes Mode 0, Mode 1, Mode 2, Mode 3, and Mode 4 will be described in detail with reference to FIGS. 10 to 14.

Figure 10:
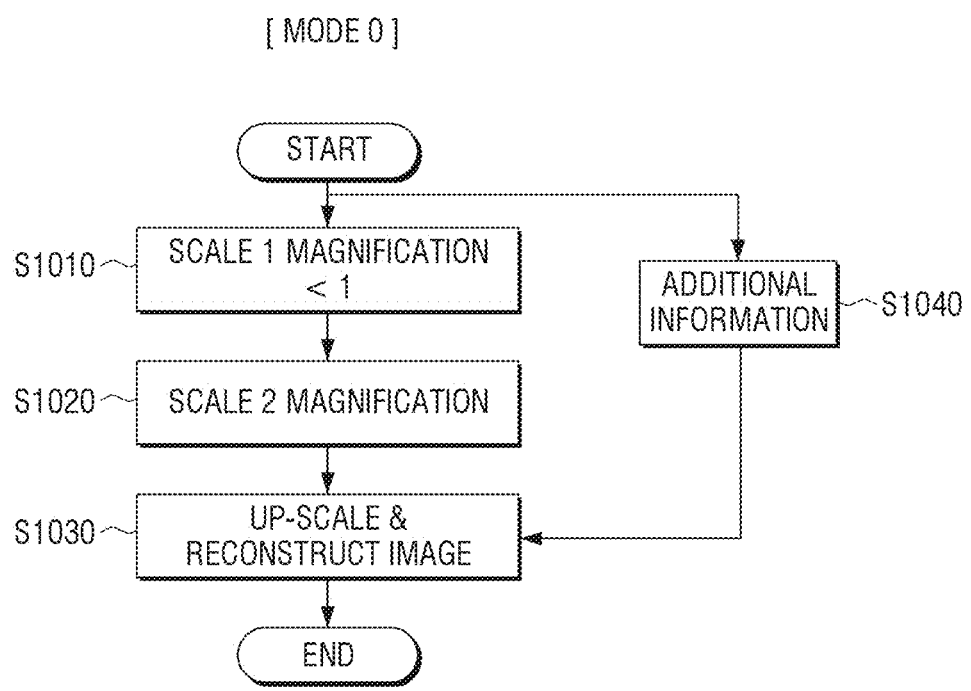

Referring to FIG. 10, in the case in which the resolution of the contents is larger than or equal to the output resolution of the display device 100, the controller 120 determines that an operation modes is Mode 0, and the first scaler 112 sets the first scaling magnification to be smaller than 1 to down-scale the contents (S1010). In addition, the controller 120 determines the second scaling magnification in consideration of the resolution of the contents processed at the first scaling magnification and the output resolution of the display device 100 (S1020), and the second scaler 131 may up-scale the contents processed at the first scaling magnification depending on the determined second scaling magnification and perform image reconstruction (S1030).

Here, the first scaler 112 may determine the first scaling magnification and the scaling scheme of the first scaler 112 on the basis of at least one of the characteristic information of the contents and the power state of the display device, and may additionally detect metadata or a high frequency component for the resolution of the contents for sufficiently reconstructing the resolution of the contents later in the display 130.

The first scaler 112 may transmit the characteristic information of the contents and information on the power state of the display device used to determine the first scaling magnification and the scaling scheme of the first scaler 112 and information on the metadata, the high frequency component, or the like, for the resolution of the contents for supporting the reconstruction of the contents in the display 130 in a form of additional information to the second scaler 131 (S1040).

In addition, the second scaler 131 may determine the scaling scheme of the second scaler 131 in consideration of the characteristic information of the contents, information on the scaling scheme of the first scaler, and the metadata, the high frequency component, or the like, for the resolution of the contents, included in the additional information received from the first scaler 112.

Figure 11:
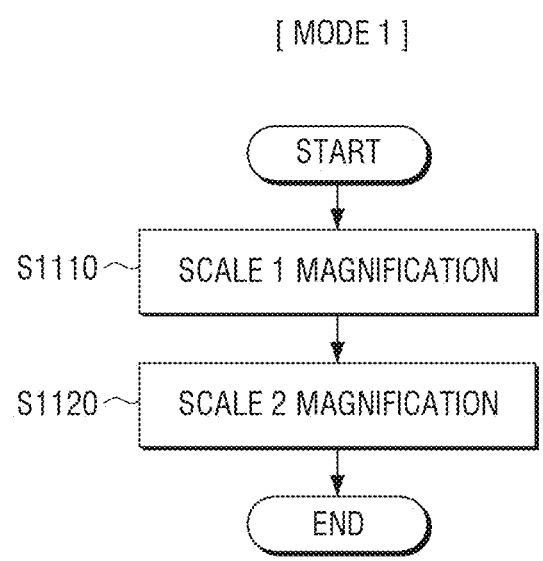

Referring to FIG. 11, in Mode 1, the first scaler 112 is in charge of scaling of the resolution up to a specific resolution or a specific magnification in scaling the resolution of the contents depending on characteristics of the contents or a setting by a user manipulation (S1110). Then, the second scaler 131 scales the resolution of the contents to be matched to the output resolution of the display device 100 (S1120). Meanwhile, it does not mean that Mode 0 is selected in the case in which the first scaling magnification is smaller than 1 as illustrated in FIG. 10 and Mode 1 is selected in the case in which the first scaling magnification is larger or equal to 1. That is, in FIG. 11, the first scaler 112 may down-scale or up-scale the input contents depending on the characteristics of the input contents or the user setting. Therefore, the second scaler 131 may up-scale or down-scale the contents depending on the first scaling magnification determined in the first scaler 112 or the scaling scheme of the first scaler 112.

In addition, likewise, the first scaler 112 may determine the first scaling magnification and the scaling scheme of the first scaler 112 on the basis of at least one of the characteristic information of the contents and the power state of the display device and may additionally detect metadata or a high frequency component for the resolution of the contents for sufficiently reconstructing the resolution of the contents later in the display 130, and the second scaler 131 may determine the scaling scheme of the second scaler 131 in consideration of the characteristic information of the contents, the scaling scheme of the first scaler, and the metadata, the high frequency component, or the like, for the resolution of the contents, included in additional information received from the first scaler 112.

Figure 12:
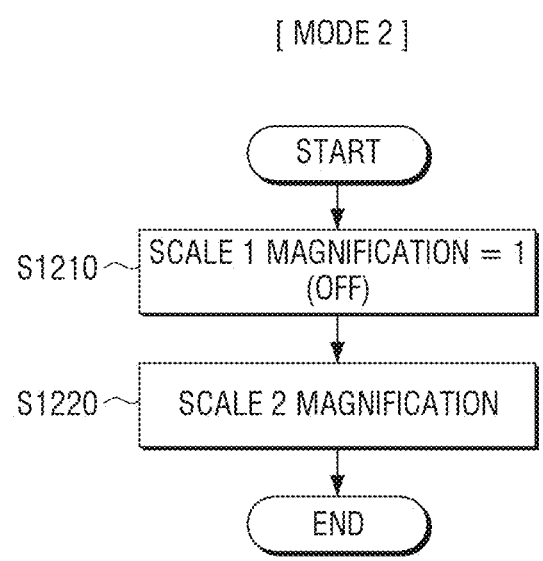

Referring to FIG. 12, which illustrates that the controller 120 determines that an operation mode is Mode 2, the first scaler 112 may set the first scaling magnification to 1 to scale the contents (S1210). That is, the first scaler 112 does not apply a scaling magnification to the input contents, but maintains an original resolution of the input contents. An operation in which the first scaler 112 does not apply the scaling magnification to the input contents as described above may be implemented by turning off the first scaler 112 to allow the first scaler 112 not to perform any operation, be implemented by allowing the first scaler 112 to set the first scaling magnification to 1 to scale the contents as described above, or be implemented by allowing the first scaler 112 to bypass and output data on the input contents.

In addition, the first scaler 112 transmits the contents to the second scaler 131 with the original resolution of the input contents being maintained as it is, the controller 120 determines the second scaling magnification in consideration of the original resolution of the contents and the output resolution of the display device 100, and the second scaler 131 may determine the scaling scheme of the second scaler 131 (S1220).

For example, as described above with reference to FIG. 8, in the case in which the original resolution of the input contents is 1280×720, the first scaler 112 transmits the contents to the display 130 through the frame buffer 113 and the interface 140 with the resolution of the input contents being maintained as 1280×720, and the second scaler 131 included in the display 140 determines the second scaling magnification and the scaling scheme of the second scaler 131 in consideration of 1280×720, which is the resolution of the contents, and 2560×1440, which is the output resolution of the display device. In addition, in this case, as described above, the resolution of the contents transmitted through the frame buffer 113 and the interface 140 is maintained as 1280×720, such that the data rate, the amount of used power, the amount of used resources, and the like, are decreased.

In addition, likewise, the first scaler 112 may determine the first scaling magnification and the scaling scheme of the first scaler 112 on the basis of at least one of the characteristic information of the contents and the power state of the display device 100 and may additionally detect metadata or a high frequency component for the resolution of the contents for sufficiently reconstructing the resolution of the contents later in the display 130, and the second scaler 131 may determine the scaling scheme of the second scaler 131 in consideration of the characteristic information of the contents, the scaling scheme of the first scaler, and the metadata, the high frequency component, or the like, for the resolution of the contents, included in additional information received from the first scaler 112.

Figure 13:
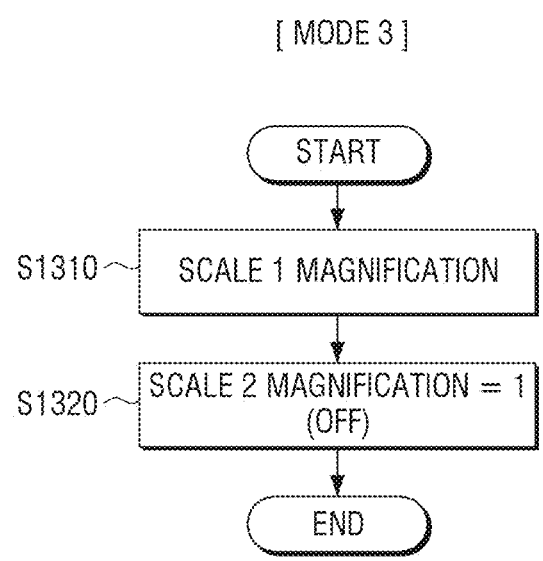

Referring to FIG. 13, which illustrates that the controller 120 determines that an operation mode is Mode 3 and relates to a scaling method mainly used in the related art, a case in which the first scaler 112 scales the input contents to the output resolution of the display device 100 before transmitting the input contents to the display 130 is illustrated.

In detail, the first scaler 112 determines the first scaling magnification and the scaling scheme of the first scaler 112 in consideration of the resolution of the input contents and the output resolution of the display device 100 to scale the input contents (S1310), and the second scaler 131 does not apply the scaling magnification to the contents scaled in the first scaler 112, but maintains the resolution of the contents scaled in the first scaler 112 and displays the contents (S1320).

For example, in the case in which a user performs a touch manipulation while viewing a video, such that a user interface screen is displayed or in the case in which a screen displayed on the display 130 is intended to be captured and stored, the controller 120 does not perform scaling by driving both of the first scaler 112 and the second scaler 131, but may rapidly perform scaling using only the first scaler 112.

Meanwhile, in the case in which the controller determines that the operation mode is Mode 3, the second scaler 131 does not perform the scaling. Therefore, the first scaler 112 does not need to transmit the additional information including the characteristic information of the contents, the information on the scaling scheme of the first scaler, and the metadata, the high frequency component, or the like, for the resolution of the contents to the second scaler 131.

In addition, the second scaler 131 does not apply the scaling magnification to the contents scaled in the first scaler 112, but maintains the resolution of the contents scaled in the first scaler 112. An operation in which the second scaler 131 does not apply the scaling magnification to the contents scaled in the first scaler 112 may be implemented by turning off the second scaler 131 to allow the second scaler 131 not to perform any operation, be implemented by allowing the second scaler 131 to set the second scaling magnification to 1 to scale the contents, or be implemented by allowing the second scaler 131 to bypass and output data on the contents scaled in the first scaler 112.

Figure 14:
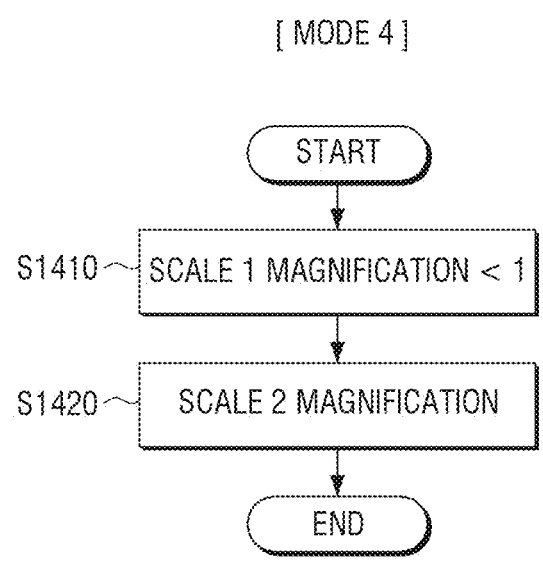

Referring to FIG. 14, which illustrates that the controller 120 determines that an operation mode is Mode 4, a case in which the display device 100 is operated at a low power is illustrated. In detail, in the case in which a user setting or a remaining capacity of a battery is decreased to a predetermined threshold value or less or in the case in which the display device 100 needs to be operated to ensure a use time set by the user, the controller 120 may determine that the operation mode is Mode 4.

Therefore, even though the original resolution of the contents is the same as the output resolution of the display device 100, the first scaler 112 sets the first scaling magnification to be smaller than 1 to down-scale the input contents (S1410), the controller 120 determines the second scaling magnification in consideration of a resolution of the contents scaled in the first scaler 112 and the output resolution of the display device 100, and the second scaler 131 may up-scale the contents down-scaled in the first scaler 112 (S1420).

For example, as illustrated in FIG. 7, in the case in which the original resolution of the input contents is 2560×1440, when the remaining capacity of the battery of the display device 100 is decreased to the predetermined threshold value or less, such that the display device 100 needs to be operated at the low power, the first scaler 112 may down-scale the original resolution of the input contents to 1920×1080 and transmit the contents downscaled to 1920×1080 to the display 130 through the frame buffer 113 and the interface 140, and the second scaler 131 included in the display 130 may up-scale the contents down-scaled to 1920×1080 to 2560×1440, which is the output resolution of the display device 100.

Therefore, the resolution of the contents transmitted through the frame buffer 113 and the interface 140 is 1920×1080, such that a data rate is decreased by 44% and amounts of used power or resources are also decreased, thereby making it possible to decrease a decrease rate in the battery of the display device 100.

In addition, likewise, the first scaler 112 may determine the first scaling magnification and the scaling scheme of the first scaler 112 on the basis of at least one of the characteristic information of the contents and the power state of the display device 100 and may additionally detect metadata or a high frequency component for the resolution of the contents for sufficiently reconstructing the resolution of the contents later in the display 130, and the second scaler 131 may determine the scaling scheme of the second scaler 131 in consideration of the characteristic information of the contents, the scaling scheme of the first scaler, and the metadata, the high frequency component, or the like, for the resolution of the contents, included in additional information received from the first scaler 112.

Meanwhile, the first scaler 112 may differently apply the first scaling magnification and the scaling scheme of the first scaler 112 to each of frames of the contents to perform scaling, the controller 120 may determine the second scaling magnification for each of the frames of the contents, and the second scaler 131 may perform scaling on the basis of the scaling scheme of the second scaler 131 determined for each of the frames of the contents and the second scaling magnification determined in the controller 120.

That is, the first scaler 112, the controller 120, and the second scaler 131 may differently apply the first scaling magnification, the scaling scheme of the first scaler 112, the second scaling magnification, and the scaling scheme of the second scaler 131 to each of the frames of the contents to perform scaling.

Figure 15:
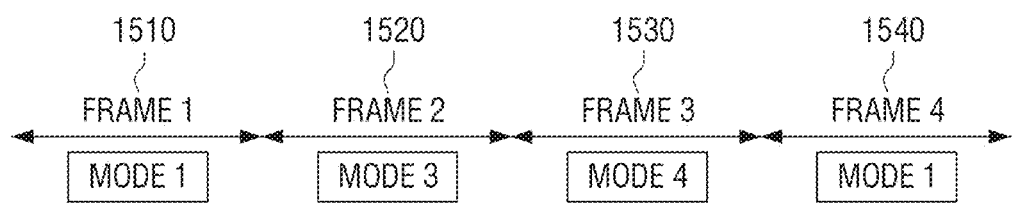
FIG. 15 is a view for describing a process of performing scaling on each of frames according to an exemplary embodiment of the present disclosure.

FIG. 15 is a view for describing a process of performing scaling on each of frames according to an exemplary embodiment of the present disclosure.

Referring to FIG. 15, the controller 120 may determine an operation mode for each of frames 1510, 1520, 1530, and 1540 in consideration of an image processing state, characteristics of contents, a power state of the display device, and the like, and the first scaler 112, the controller 120, and the second scaler 131 may differently apply the first scaling magnification, the scaling scheme of the first scaler 112, the second scaling magnification, and the scaling scheme of the second scaler 131 to each of the frames 1510, 1520, 1530, and 1540 depending on the determined operation mode to perform scaling.

For example, the controller 120 determines that the operation mode is Mode 1 in Frame 1 1510, such that the first scaler 112 is in charge of scaling up to a specific resolution depending on the characteristics of the contents or the user setting. Then, the second scaler 131 performs scaling to be matched to the output resolution of the display device 100. Then, when a situation in which a user interface screen needs to be rapidly displayed as an overlapped screen due to an input of a touch manipulation of the user in Frame 2 1520 occurs, the controller 120 determines that the operation mode is Mode 3, such that the first scaler 112 scales a user interface screen corresponding to the immediately input contents or user manipulation up to the output resolution of the display device 100.

In addition, the controller 120 may determine that the operation mode is Mode 3 to perform scaling to drive the display device at a low power in the next Frame 3 1530, and then changes the operation mode to Mode 1 in Frame 4 1540.

As described above with reference to FIG. 15, the first scaler 112, the controller 120, and the second scaler 131 may apply different scaling magnifications and scaling schemes to each of the frames of the contents depending on the characteristics of the contents, the power state of the display device 100, the user setting, and the like, to perform the scaling.

Meanwhile, in the case in which the first scaling magnification is a value that exceeds 0 and is less than 1 and the second scaling magnification is a value that exceeds 1, the first scaler 112 may down-scale the contents, and the second scaler 131 may up-scale the down-scaled contents.

Figure 16:
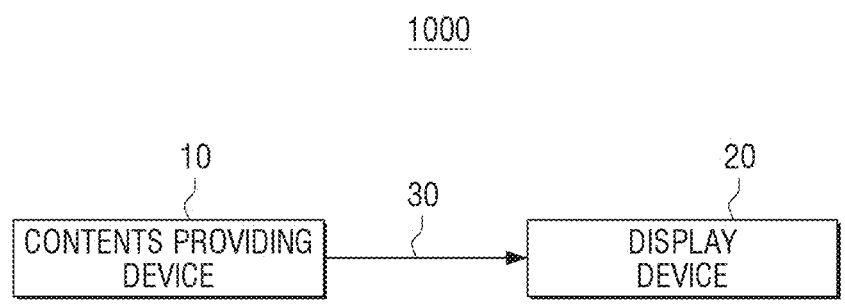
FIG. 16 is a block diagram illustrating components of a system according to an exemplary embodiment of the present disclosure.

FIG. 16 is a block diagram illustrating components of a system according to an exemplary embodiment of the present disclosure.

The system 1000 includes a display device 20, a contents providing device 10 providing contents to the display device 20, and an interface 30 transmitting the contents scaled in the contents providing device 10 to the display device 20, wherein the contents providing device 10 image-processes the contents, scales the contents at a first scaling magnification, and transmits the contents scaled at the first scaling magnification to the display device 20, and the display device 20 determines a second scaling magnification on the basis of a resolution of the contents scaled at the first scaling magnification and an output resolution of the display device 20, scales the contents scaled at the first scaling magnification depending on the second scaling magnification, and displays the contents scaled depending on the second scaling magnification.

For example, in the case in which a mobile device (not illustrated) and a television (TV) (not illustrated) perform wireless communication therebetween to perform a mirroring operation in which contents reproduced in the mobile device (not illustrated) are reproduced in the TV (not illustrated), the mobile device (not illustrated) may image-process the contents, scale the contents at a first scaling magnification, and transmit the contents scaled at the first scaling magnification to the TV (not illustrated), similar to the image processor 110 described above, and the TV (not illustrated) may determine a second scaling magnification on the basis of a resolution of the contents scaled at the first scaling magnification in the mobile device (not illustrated) and an output resolution of the TV (not illustrated), scale the contents scaled at the first scaling magnification in the mobile device (not illustrated) and received from the mobile device (not illustrated) depending on the second scaling magnification, and display the contents scaled depending on the second scaling magnification.

In this case, the interface 30 may be implemented by wireless communication.

The contents providing device 10 may determine the first scaling magnification and a scaling scheme of the contents providing device 10 on the basis of at least one of characteristic information of the contents, a power state of the contents providing device, and a connection state between the contents providing device and the display device. That is, the contents providing device 10 may decide whether or not a resolution of the contents is a high resolution, whether or not a consumption state of a battery of the contents providing device 10, a connection state of a channel through which the contents providing device and the display device are connected to each other are smooth, and the like, and determine the first scaling magnification and the scaling scheme of the contents providing device 10 on the basis of the decision.

In addition, the contents providing device 10 transmits at least one of the characteristic information of the contents and information on the scaling scheme of the contents providing device 10 to the display device 20, and the display device 20 may determine a scaling scheme of the display device 20 on the basis of at least one of the characteristic information of the contents and the information on the scaling scheme of the contents providing device 10. Here, the process of determining the scaling scheme of the second scaler 131 described above may be similarly applied.

Figure 17:
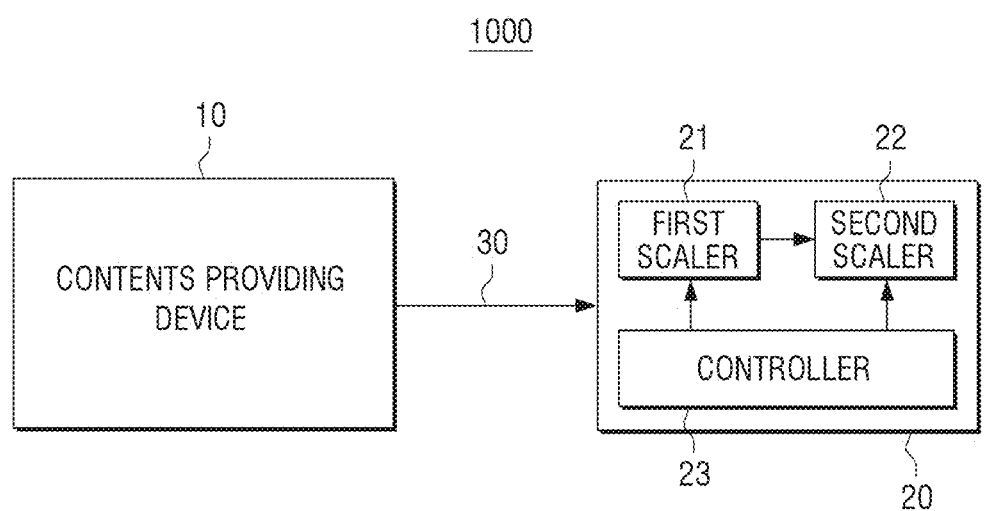
FIG. 17 is a block diagram illustrating detailed components of a display device configuring the system according to an exemplary embodiment of the present disclosure.

Meanwhile, FIG. 17 is a block diagram illustrating detailed components of a display device configuring the system according to an exemplary embodiment of the present disclosure.

The display device 20 includes a plurality of scalers 21 and 22 and a controller 23. In detail, the controller 23 may control some of the plurality of scalers 21 and 22 to be turned off and control the others of the plurality of scalers 21 and 22 to scale contents scaled at a first scaling magnification depending on a second scaling magnification.

For example, when the contents down-scaled in the contents providing device 10 are input to the display device 20, the controller 23 may control the first scaler 21 to be turned off to allows the contents to pass through the first scaler 21, and control the second scaler 22 to scale the contents to be matched to an output resolution of the display device 20.

The controller 23 may also control the first scaler 21 to scale the contents down-scaled in the contents providing device 10 up to a specific resolution in consideration of characteristic information of the contents, a power state of the display device 20, or the like, and control the second scaler 22 to scale the contents up to the output resolution of the display device 20.

In addition, the scheme of applying different scaling magnifications and scaling schemes to each of the frames of the contents to perform the scaling described above with reference to FIG. 15 may also be applied to a process of performing the scaling in the system 1000 described above with reference to FIGS. 16 and 17.

Figure 18:
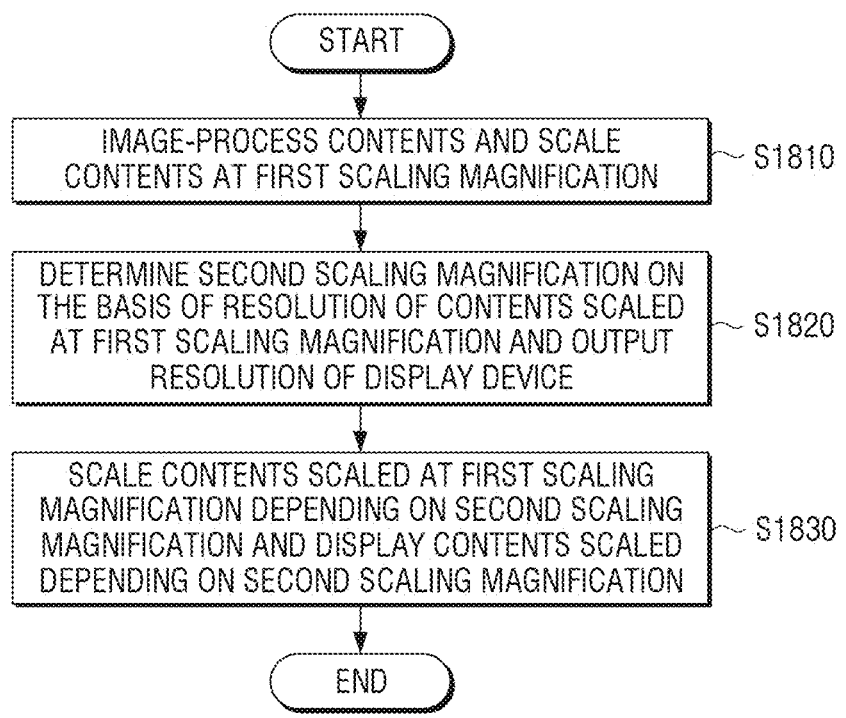
FIG. 18 is a flow chart for describing a controlling method for a display device including a first scaler and a second scaler according to an exemplary embodiment of the present disclosure.

FIG. 18 is a flow chart for describing a controlling method for a display device including a first scaler and a second scaler according to an exemplary embodiment of the present disclosure.

According to the controlling method illustrated in FIG. 18, the contents are image-processed and are scaled at the first scaling magnification (S1810).

In addition, the second scaling magnification is determined on the basis of the resolution of the contents scaled at the first scaling magnification and the output resolution of the display device 100 (S1820).

Then, the contents scaled at the first scaling magnification are scaled depending on the second scaling magnification, and the contents scaled depending on the second scaling magnification are displayed (S1830).

Here, in the process (S1810) of scaling the contents at the first scaling magnification, the first scaling magnification and the scaling scheme of the first scaler 112 may be determined on the basis of at least one of the characteristic information of the contents and the power state of the display device 100.

In addition, the controlling method for a display device according to an exemplary embodiment of the present disclosure further includes transmitting at least one of the characteristic information of the contents and the information on the scaling scheme of the first scaler 112 to the second scaler 131, wherein in the process (S1830) of displaying the contents scaled depending on the second scaling magnification, the scaling scheme of the second scaler may be determined on the basis of at least one of the characteristic information of the contents and the information on the scaling scheme of the first scaler 112.

In addition, in the process (S1810) of scaling the contents at the first scaling magnification, the first scaling magnification and the scaling scheme of the first scaler 112 may be differently applied to each of the frames of the contents to perform the scaling, in the process (S1820) of determining the second scaling magnification, the second scaling magnification may be determined for each of the frames of the contents, and in the process (S1830) of displaying the contents scaled depending on the second scaling magnification, the scaling scheme of the second scaler 131 may be determined for each of the frames of the contents and the scaling may be performed on the basis of the scaling scheme of the second scaler 131 and the second scaling magnification determined for each of the frames of the contents.

Meanwhile, in the case in which the first scaling magnification is 0 or more and less than 1 and the second scaling magnification is 1 or more, in the process (S1810) of scaling the contents at the first scaling magnification, the contents are down-scaled, and in the process (S1830) of displaying the contents scaled depending on the second scaling magnification, the down-scaled contents are up-scaled.

Here, the characteristic information of the contents includes at least one of a kind of contents, a size and a distribution of boundary lines of objects included in the contents, a kind and a distribution of characters included in the contents, and the resolution.

Meanwhile, a non-transitory computer readable medium in which a program sequentially performing the controlling method according to the present disclosure is stored may be provided.

As an example, a non-transitory computer readable medium in which a program performing image-processing the contents and scaling the contents at the first scaling magnification, determining the second scaling magnification on the basis of the resolution of the contents scaled at the first scaling magnification and the output resolution of the display device, and scaling the contents scaled at the first scaling magnification depending on the second scaling magnification is stored may be provided.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

In addition, although buses are not illustrated in the block diagram of the display device, communication between the respective components in the display device may be performed through the buses. In addition, a processor such as a central processing unit (CPU), a microprocessor, or the like, performing various processes described above may be further included in each device.

Although the exemplary embodiments of the present disclosure have been illustrated and described hereinabove, the present disclosure is not limited to the specific exemplary embodiments described above, but may be variously modified by those skilled in the art to which the present disclosure pertains without departing from the scope and spirit of the disclosure as claimed in the claims. These modifications should also be understood to fall within the scope of the present disclosure.

The invention claimed is:

1. A display device comprising:
    an image processor comprising a first scaler configured to down-scale contents at a first scaling magnification; and
    a display comprising a second-scaler,
    wherein the second scaler is configured to up-scale the down-scaled contents at a second scaling magnification corresponding to a resolution of the display,
    wherein the display is configured to display the up-scaled contents, and
    wherein the first scaler is configured to obtain the first scaling magnification and a down-scaling scheme of the first scaler based on at least one of characteristic information of the contents and a power state of the display device.

2. The display device as claimed in claim 1, wherein the first scaler is configured to transmit at least one of characteristic information of the contents or information on a down-scaling scheme of the first scaler to the second scaler, and
    the second scaler is configured to obtain an up-scaling scheme based on at least one of the characteristic information of the contents or the information on the down-scaling scheme.

3. The display device as claimed in claim 2, wherein the first scaler is configured to differently apply the first scaling magnification and the down-scaling scheme to each frame of the contents to perform up-scaling, and
    the second scaler is configured to obtain the up-scaling scheme for each frame of the contents and to perform scaling based on the up-scaling scheme of the second scaler obtained for the each frame of the contents and the second scaling magnification obtained for the each frame of the contents.

4. The display device as claimed in claim 2, further comprising an interface connecting the image processor and the display to each other,
   wherein the down-scaled contents, the kind of the contents, the characteristic information of the contents, and the information on the down-scaling scheme are transmitted through the interface.

5. The display device as claimed in claim 1, wherein the second scaler is configured to identify a layout structure of pixels based on the characteristic information of the contents, obtain a scaling weight of the pixels based on the layout structure of the pixels, and obtain the up-scaling scheme based on the scaling weight of the pixels.

6. The display device as claimed in claim 1, wherein the first scaling magnification exceeds 0 and is less than 1 and the second scaling magnification exceeds 1.

7. The display device as claimed in claim 1, wherein the characteristic information of the contents includes at least one of a size and a distribution of boundary lines of objects included in the contents, a kind of characters included in the contents and a distribution of characters included in the contents, or a resolution.

8. A controlling method for a display device including an image processor and a display, comprising:
   down-scaling, by a first scaler included in the image processor, contents at a first scaling magnification; and
   up-scaling, by a second scaler included in the display, the down-scaled contents at a second scaling magnification corresponding to a resolution of the display; and
   displaying the up-scaled contents,
   wherein the down-scaling comprises:
      obtaining the first scaling magnification and a down-scaling scheme based on at least one of characteristic information of the contents and a power state of the display device; and
      down-scaling the contents at the first scaling magnification using the down- scaling scheme.

9. The controlling method for a display device as claimed in claim 8, further comprising:
   transmitting, by the first scaler, at least one of characteristic information of the contents or information on a down-scaling scheme of the first scaler to the second scaler; and
   wherein the up-scaling comprises:
      obtaining an up-scaling scheme based on at least one of the characteristic information of the contents or the information on the down-scaling scheme; and
      up-scaling the down-scaled contents at the second scaling magnification using the up-scaling scheme.

10. The controlling method for a display device as claimed in claim 9, wherein the obtaining comprises:
    identifying a layout structure of pixels based on the characteristic information of the contents;
    obtaining a scaling weight of the pixels based on the layout structure of the pixels; and
    obtaining the up-scaling scheme based on at least one of the scaling weight of the pixels and or the information on the down-scaling scheme.

11. The controlling method for a display device as claimed in claim 9, wherein the down-scaling comprises differently applying the first scaling magnification and the down-scaling scheme to each frame of the contents to perform scaling,
    wherein the up-scaling comprises:
       obtaining the up-scaling scheme for each frame of the contents; and
       performing up-scaling based on the up-scaling scheme of the second scaler obtained for the each frame of the contents and the second scaling magnification obtained for the each frame of the contents.

12. The controlling method for a display device as claimed in claim 8, wherein the first scaling magnification exceeds 0 and is less than 1 and the second scaling magnification exceeds 1.

13. The controlling method for a display device as claimed in claim 8, wherein the characteristic information of the contents includes at least one of a size and a distribution of boundary lines of objects included in the contents, a kind of characters included in the contents and a distribution of characters included in the contents, or a resolution.

* * * * *